United States Patent [19] [11] Patent Number: 4,481,587
Daniels, Jr. [45] Date of Patent: Nov. 6, 1984

[54] APPARATUS FOR PROVIDING INTERCHANGEABLE KEYBOARD FUNCTIONS

[75] Inventor: Edward P. Daniels, Jr., Bridgeport, Conn.

[73] Assignee: Pitney Bowes Inc., Stamford, Conn.

[21] Appl. No.: 334,116

[22] Filed: Dec. 24, 1981

[51] Int. Cl.³ .................... G06F 3/02; G01G 19/40
[52] U.S. Cl. ................................ 364/466; 364/567; 340/365 VL; 177/25
[58] Field of Search .................. 364/466, 567; 340/365 VL; 177/DIG. 3, 25

[56] References Cited

U.S. PATENT DOCUMENTS

| 3,971,925 | 7/1976 | Wenninger et al. | 340/365 VL X |
| 4,084,242 | 4/1978 | Conti | 364/466 |
| 4,135,662 | 1/1979 | Dlugos | 371/29 |
| 4,145,742 | 3/1979 | Olander, Jr. et al. | 364/709 |
| 4,145,752 | 3/1979 | Olander, Jr. et al. | 364/709 |
| 4,181,966 | 1/1980 | Wenninger et al. | 340/365 VL X |
| 4,220,991 | 9/1980 | Hamano et al. | 364/900 X |
| 4,271,481 | 6/1981 | Check, Jr. et al. | 364/900 |
| 4,280,179 | 7/1981 | Jones, Jr. et al. | 364/900 X |
| 4,280,180 | 7/1981 | Eckert et al. | 364/900 X |
| 4,377,214 | 3/1983 | Hansen et al. | 177/25 |
| 4,385,366 | 5/1983 | Housey, Jr. | 364/900 |

OTHER PUBLICATIONS

Dahl et al., "Table Selection of Key Type, Data and Scan Order", *IBM Technical Disclosure Bulletin*, vol. 23, No. 7A, Dec. 1980, pp. 2937-2939.
Andrews et al., "Upper/Lower Case and Keyboard Redefine Feature for Word Processor and Electronic Keyboard Character Translation Redefinition", *IBM Technical Disclosure Bulletin*, vol. 19, No. 8, Jan. 1977, pp. 2853-2855.

*Primary Examiner*—Gareth D. Shaw
*Assistant Examiner*—Ronni S. Malamud
*Attorney, Agent, or Firm*—Robert H. Whisker; David E. Pitchenik; William D. Soltow, Jr.

[57] ABSTRACT

An electronic weighing scale system capable of performing a plurality of functions. Predetermined subsets of the functions can be accessed from the system keyboard. The subset of functions which a particular keyboard can access is easily changed by replacing a non-volatile memory integrated circuit chip which may be the same one that contains postal rate information. Memory locations within the chip are segregated into two complementary arrays, one containing each possible combination of strobe and return signals, and the other containing a different word which defines one of the functions that the system can perform. When a particular key is actuated, the strobe/return signal output from the keyboard is compared with each of the strobe/return combinations stored in the first array. When a match is found, a function identification word is retrieved from the corresponding memory location in the second array to designate the specific function that the actuated key is intended to produce.

18 Claims, 16 Drawing Figures

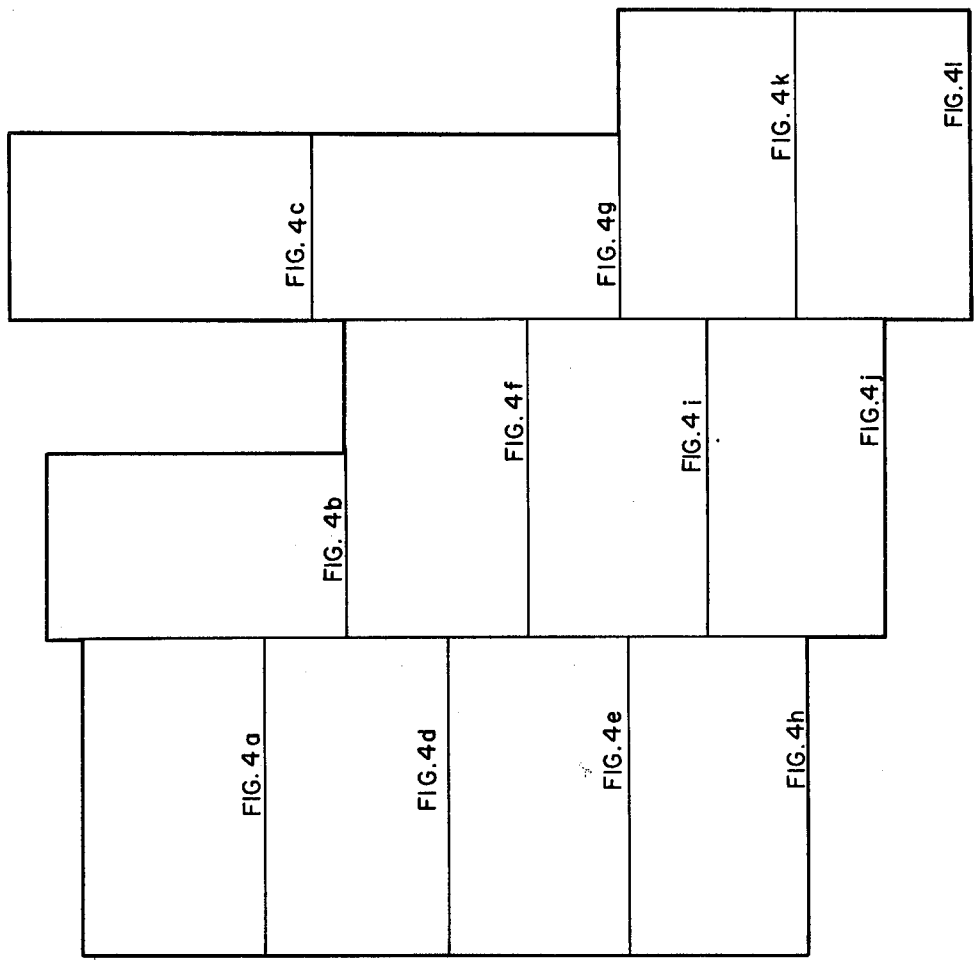

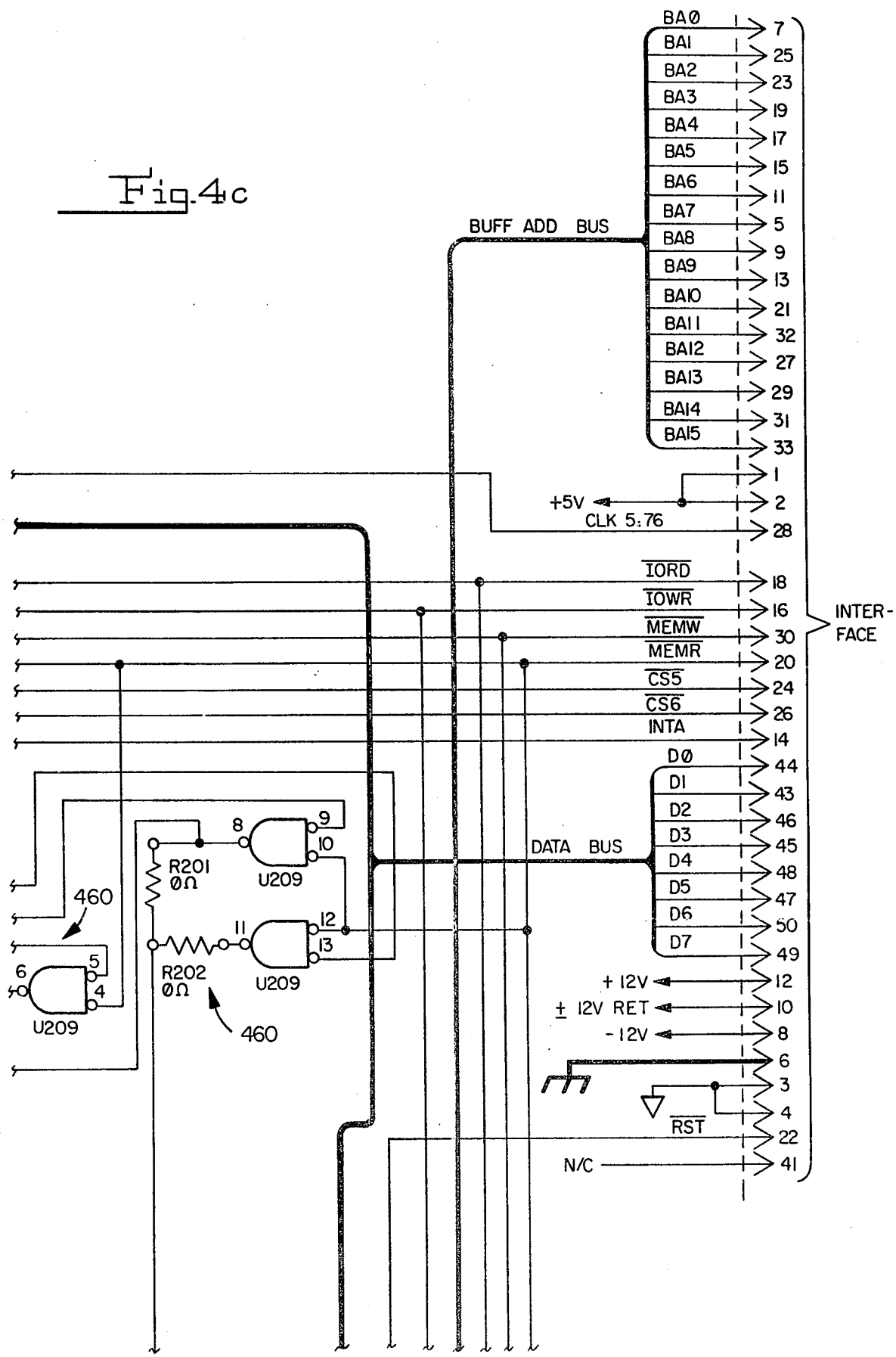

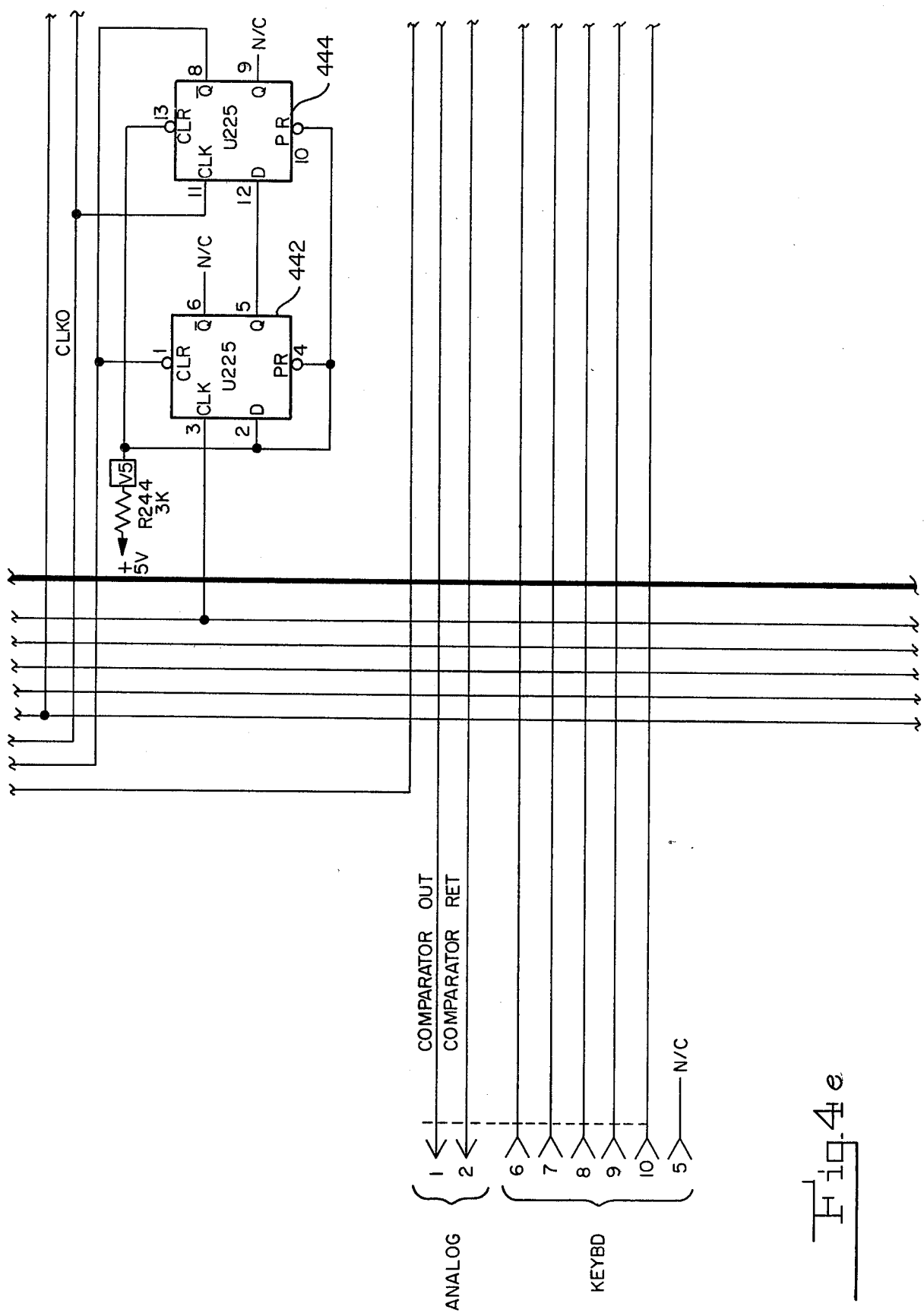

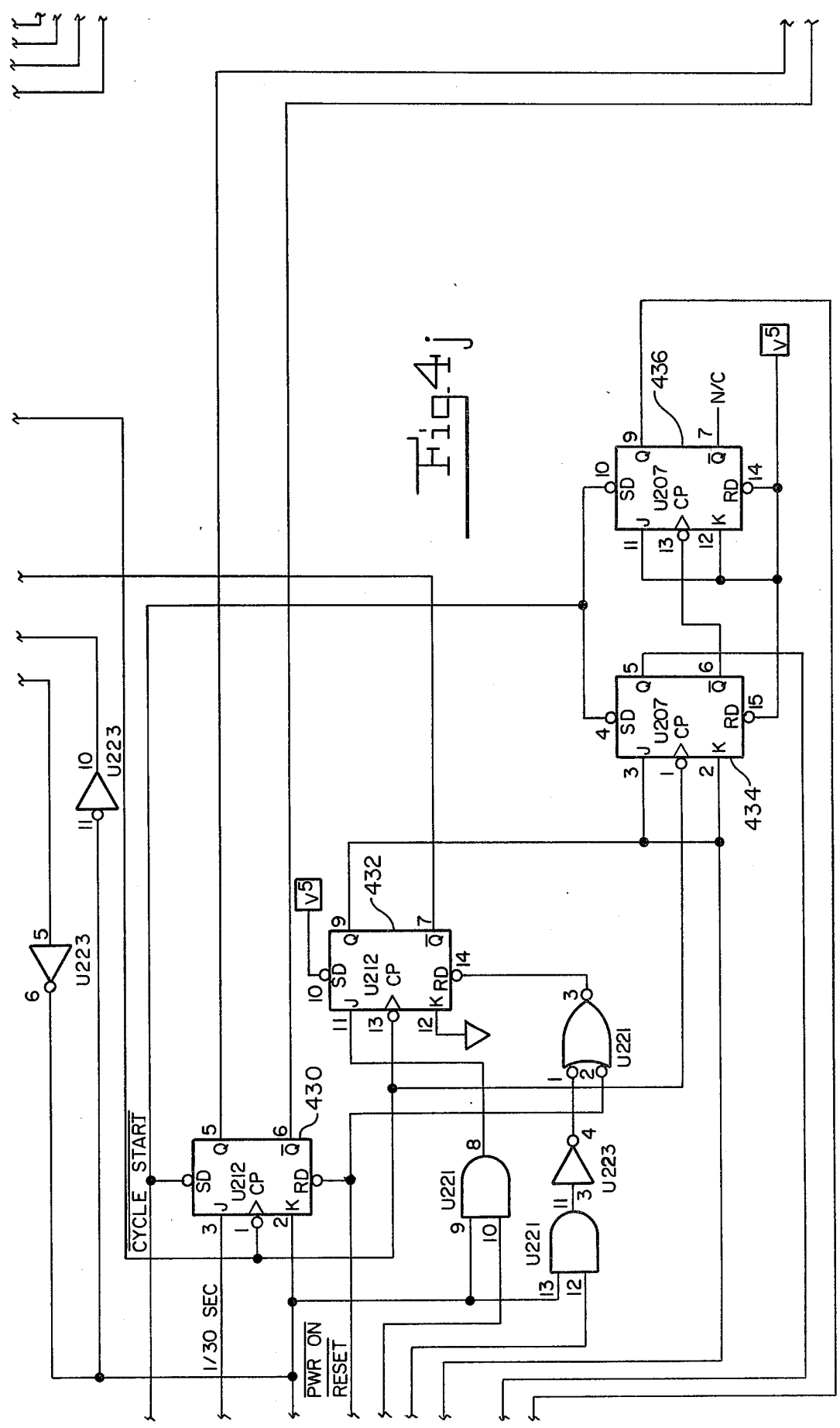

APPARATUS FOR PROVIDING INTERCHANGEABLE KEYBOARD FUNCTIONS

BACKGROUND OF THE INVENTION

1. Field of the Invention

The present invention relates to automated mailing systems and more particularly to a keyboard actuated electronic mailing system wherein the functions accessible by the keyboard can be changed.

2. Description of the Prior Art

Typical electronic postage scales can be broken down into four basic subsystems. These are the mechanical scale, the keyboard and display, the scale and system processor ("main processor"), and an interface for peripheral devices. The heart of the system is the main processor which includes software sometimes known as the "main line code". It is the main line code which directs the scale functions.

In prior postage scale designs, keyboard decoding was performed by the main processor. Thus, the main line code was used to determine which machine function corresponded to a particular key which has been actuated. Although these systems perform adequately, they suffer from the limitation that in order to change the functional designation of a particular key or keys on the keyboard, the main line code has to be altered. Such a software change is undesirable for several reasons. First, the alteration of any subroutine(s) within the main line code is complicated by the fact that the entire operation of the main line code after the change generally has to be verified by rather rigorous testing. Second, since the main line code is resident in the main processor, it is not easily altered. Third, once a particular functional keyboard layout has been programmed within the main line code, the layout cannot be temporarily changed (e.g., by a technician) to provide alternate functions or a different keyboard layout.

In U.S. Pat. No. 3,602,894, a key-entry system is disclosed which has different program keys for selecting a plurality of programs. The functions of the keys, however, remain fixed, although the program that is executed at any given time is changeable.

U.S. Pat. No. 4,080,659 teaches the use of a calculator having a replaceable ROM programming assembly for use in calculating and filling out personal income tax forms. A keyboard is provided which includes standard numerical digit and arithmetic function keys. Some of these keys are operable only when the calculator is in an arithmetic operation mode, but none of the key functions changes upon replacement of one ROM for another.

Another prior art system is disclosed in U.S. Pat. No. 4,145,742. A programmable calculator employs modular read-write memory and ROM units for storing programs and data. In addition to fixed value keys, the keyboard includes certain specified definable keys for calling up user-defined or preprogrammed subroutines. The additional key functions are obtained by the replacement, in whole or in part, of the mainline program stored in the calculator. With the insertion of appropriate ROM units, all users have access to the functions defined thereby.

A typical electronic postage meter is disclosed in U.S. Pat. No. 3,978,457 entitled "Microcomputerized Electronic Postage Meter System" issued Aug. 31, 1976 to Frank P. Check, Jr. et al and also assigned to the assignee of the present invention.

Another postage calculator is disclosed in U.S Pat. No. 4,139,892. In the system disclosed in this patent, a postage scale is used in conjunction with random access memories (RAM) and programmable read-only memories (PROM) to perform a weighing operation. The postage calculation operation and a data display operation proceed according to various keyboard entries. Typical keys on a postage scale keyboard are the numerical keys from 0 to 9, postal rate keys designating various types of postage service (e.g., surface mail, airmail, first class, book rate), and special service keys (e.g., registered, special delivery, C.O.D., certified).

It would be advantageous to provide a system where the format of a keyboard can be readily changed so that the functions initiated by different keys can be swapped to suit a particular user's needs or preference.

It would also be advantageous to provide a system wherein the set of functions that can be accessed by the system keyboard can be readily changed without replacing all or part of the mainline program. In such an instance, the system itself would be capable of performing any one of a master set of functions. The system keyboard would then be customized to provide any desired subset of those functions which a user requires. The ability to change the functions accessible by the system keyboard, without having to change the mainline program, should be available to a service technician so that the keyboard functions can be readily changed in the field.

As hereinabove mentioned, the ability to change keyboard formats and/or functions should be available without the need for changing the mainline code which is resident in the main processor. Such a system would enable a service representative to change the subset of functions which the system keyboard can access so that specific service functions, not available to the regular system user, can be performed.

SUMMARY OF THE INVENTION

In accordance with the present invention, a hardware structure decodes keyboard functions in a separate, replaceable non-volatile memory such as a read only memory (ROM). The ROM used for this purpose may be the same one which contains the postal rate data (known as the "directory" ROM) in an electronic postal scale. Extra money locations within the directory ROM are segregated into two corresponding arrays. One of these arrays contains data representing each possible combination of strobe and return signals which can be generated by the system keyboard. A different strobe and return combination is stored in each array location. Each location in the second array contains a different binary word which defines a particular function that has been programmed into the main line code resident in the system's main processor.

The main line code contains a complete package of software that can accomplish every function the scale is capable of performing. A given keyboard, however, will contain only a subset of these functions. When a particular keyboard key is actuated, a specific strobe and return signal will be output from the keyboard to designate that the key has been depressed. The strobe and return signal is compared with each of the strobe and return combinations stored in the first array of the directory ROM. For each memory location in the first array of the directory ROM, there is a corresponding memory location in the second array. Thus, when a match is found between a strobe and return signal coming from the keyboard and a strobe and return combination stored in the first array, the function identification word can be retrieved from the corresponding memory location in the second array. The particular function identification word retrieved will designate the specific function that the actuated key is intended to produce.

It can be seen from the above arrangement that by merely changing the directory ROM, the decoding of a standard keyboard can be altered so that for different directory ROMs the same key will actuate different functions. Since the set of all possible functions is always stored in the main line code, the directory ROM can be used to define subsets thereof which will be available to the user through the keyboard.

Once the directory ROM has decoded a keyboard actuation to identify a particular function, the function identification word is output from the second array to the main line code. The main line code uses the function identification word as an address to retrieve the subroutine which executes that particular function.

It may be desired to preclude access to certain functions by the customer, but to provide access to a service representative. For example, automatic test or service-only functions (e.g., testing of the display) are not normally available to a user, but a service representative can have access to them. This restriction of specified functions is easily accomplished by providing the service representative with a directory ROM that is capable of decoding a keyboard actuation to effect the function. The service representative replaces the customer's directory ROM with his special directory ROM to access the function, and then replaces the original directory ROM in the system for subsequent use by the customer.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIGS. 4a–4l are a schematic illustration of the interface circuit with portions deleted and illustrating a PROM which stores programs for formatting communication between the system processor and the peripheral devices, a data RAM for temporary storage of data for communication to the peripheral devices and a peripheral controller which establishes communications links between the system processor and selected peripheral devices. FIG. 4 shows the relationship of FIGS. 4a through 4l.

DESCRIPTION OF THE PREFERRED EMBODIMENT

Figure 1:
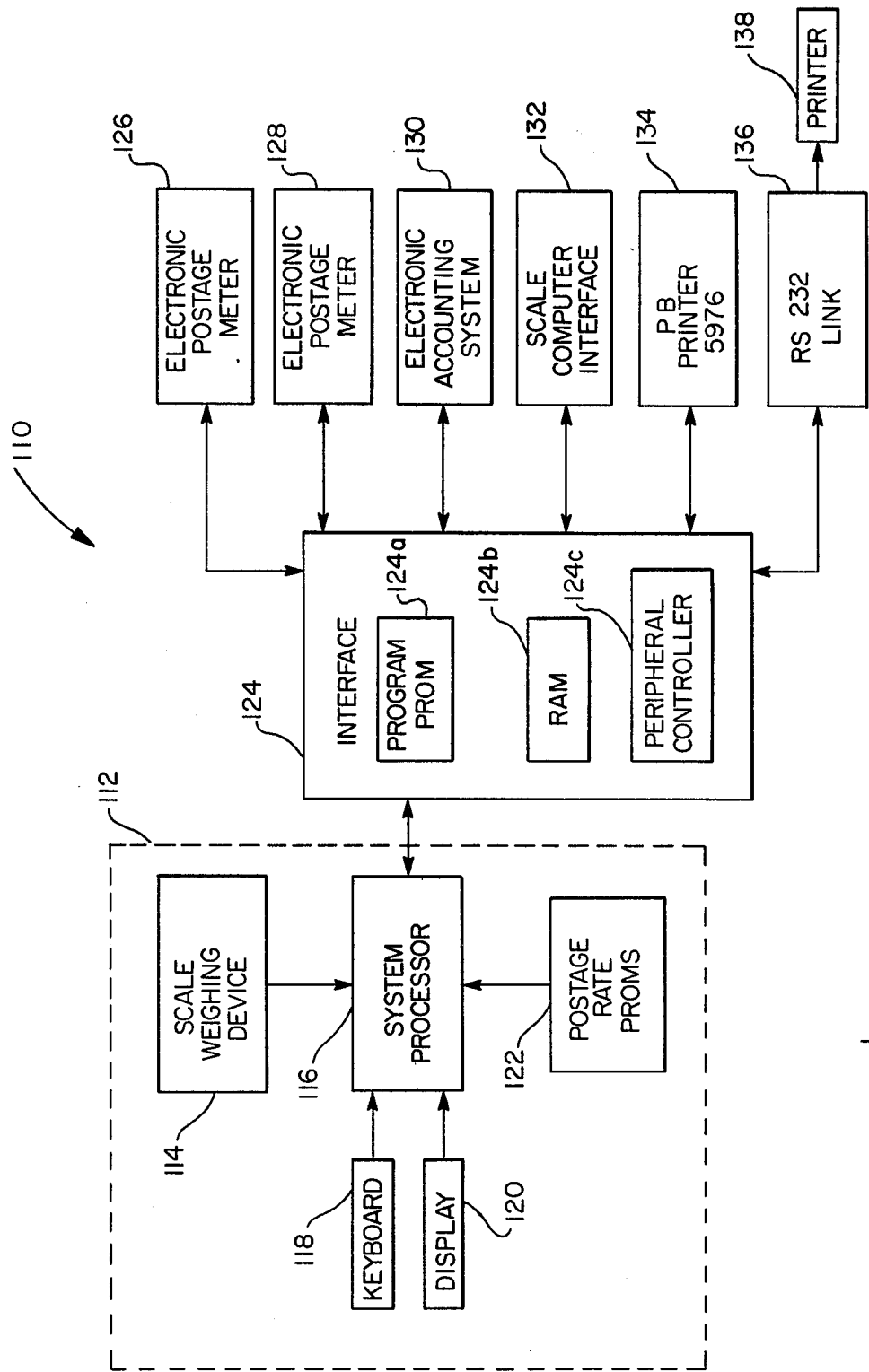
FIG. 1 is a schematized block diagram of a typical mailing system illustrating an interface constructed in accordance with and embodying the present invention interconnecting a postage value determining system processor associated with a postage scale and a plurality of mailing system peripheral devices.

Referring now in detail to FIG. 1 of the drawings, reference numeral 110 denotes generally a composite automated mailing system which includes a processor controlled stand alone postage scale 112. The scale 112 includes a weighing device 114 having a tray or platform for receiving an article to be mailed. The weighing device 114 is interconnected to a main system processor or calculator 116 which is programmed to determine the requisite postage or other transportation charge for the article. In most instances, transportation charges are based upon the article weight, class of transportation, and the distance to its destination.

The data necessary for the determination of article postage, e.g., destination operands, class of transportation operands, etc., are entered by one or more of a plurality of keys at a keyboard 118 and corresponding signals are transmitted to the system processor 116. Keyboard and calculated information are indicated at a display 120.

Article weight indication signals are generated by a detector at the weighing device 114. The detector may comprise an optical deflection detector or a strain gauge apparatus (load cell) or any suitable transducing device and a corresponding analog to digital converter, all of which are known to those of skill in the art and which are not part of the present invention hereinafter described.

With the article weight, class of transportation and destination operands entered, the system processor 116 determines the requisite postage by reference to a postage rate PROM 122 and provides a signal to the display 120 for indicating the determined postage amount.

A suitable microprocessor implementation as the system processor 116 is a Model No. 8085-A processor available from Intel Corporaton of Santa Clara, Calif. The foregoing mode of operation of the scale 112 is well known to those of skill in the art and typically illustrated in U.S. Letters Pat. No. 4,135,662 entitled "Operator Prompting System" issued Jan. 23, 1979 to Daniel F. Dlugos and assigned to the assignee of the present invention.

The postage value determining system processor disclosed in U.S. Pat. No. 4,135,662, hereinabove mentioned, was integral with a complete mailing system and transmitted a postage value signal to a meter setting device for setting a postage meter and dispensing the calculated postage.

The scale 112 is constructed as a stand alone unit which may be employed without peripheral devices associated with a complete mailing system. The scale 112 maintains versatility, however, for controlling, transmitting data to, and receiving data or commands from, various peripheral devices if a complete mailing system is desired by the user. As such, the scale 112 is available at an economical cost because its circuit board does not include memories allocated to communications formatting programs, memories allocated to the storage of data and commands during formatting routines or an interface for communication with mailing system peripheral devices.

A peripheral controller interface 124 is provided as a separate self-contained circuit board carrying support hardware, including a program PROM 124a, random access memory (RAM) 124b, a peripheral controller 124c, as well as software loaded in the program PROM 124a for formatting communications to and for establishing communications links between the system processor 116 and various peripheral devices, hereinbelow described.

Among the various peripheral devices which may be employed as part of a composite automated mailing system are one or more electronic postage meters 126, 128. Electronic postage meters of this type are described in U.S. Pat. No. 3,978,457 entitled Microcomputerized Electronic Postage Meter System, as hereinabove mentioned. In the preferred embodiment, the meter 126 is adapted to dispense U.S. Postal Service postage denominations while the meter 128 is adapted to print private carrier transportation charges, e.g., U.S. Parcel Service.

The electronic postage meters 126, 128 are programmed for communication with the system processor 116 pursuant to communications routine which is serial character asynchronous, bit synchronous, in message form, with the bits of the message being timed in accordance with a given schedule. The messages are returned or echoed by the recipient bit by bit for checking. This communications routine has been designated "Echoplex."

Further peripheral devices which are programmed for communication with the system processor 116 through the peripheral controller interface 124 and employing the Echoplex communications routine include an electronic accounting system 130, a scale computer interface 132 and a Pitney Bowes Model 5976 printer 134.

In addition, a communications link 136 is provided for communications employing an RS 232 hardware standard. The RS 232 communications link 136 may interface with one of several available RS 232 external printers 138 or any other desirable peripheral device which communicates in ASCII code, for example. Generally, a mailing system 110 would employ only one printer, i.e., either the Pitney Bowes printer 134 or the external printer 138 would be employed.

It can be seen from the description hereinbelow that the system for detecting whether a specified key on the keyboard 118 has been depressed is extremely flexible. That is, the depression of any key on the keyboard 118 can be detected, regardless of its intended function in system operation. The actual function of each key is pre-programmed in the system so that the location of any one key is not critical to system performance. Since the purpose of each key is a function of the instructions associated therewith, a user of the system can define the purpose of each key in a unique manner. Functions of certain keys can therefore be changed, duplicated elsewhere on the keyboard, or even abolished if not required in the normal course of business, or if inapplicable in certain locations in the world.

Figure 2:
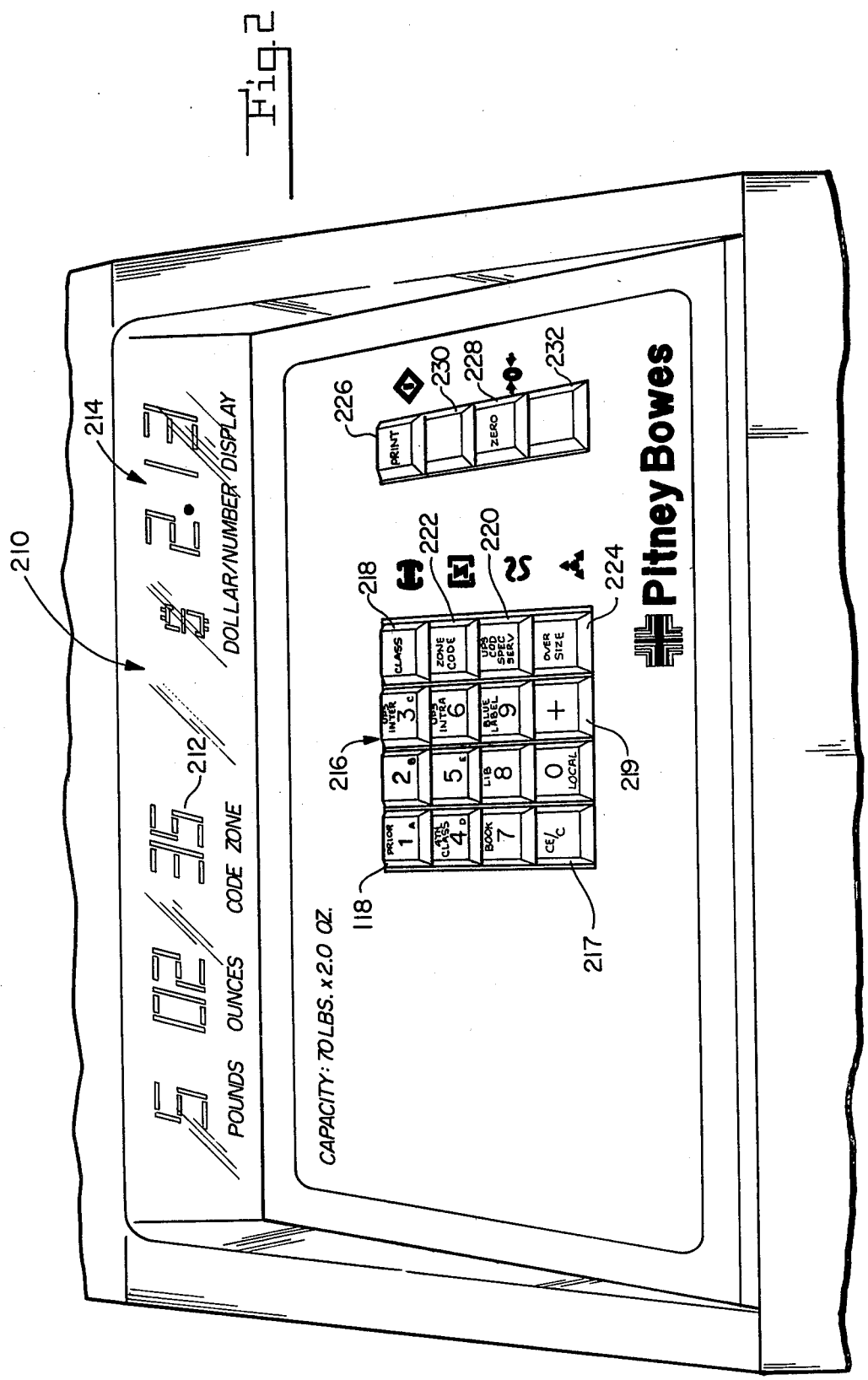
FIG. 2 shows the layout of a keyboard which would be used to enter the necessary data.

Notwithstanding the flexibility of key locations and functions on the keyboard 118 as indicated above, a preferred keyboard layout is shown in FIG. 2, which should now also be referred to. Adjacent to the keyboard 118 is a visual display 210 capable of displaying a parcel weight in pounds (or kilograms) and ounces (or grams). The visual display 210 includes a code/zone section 212 and a dollars/number display section 214 on which computed postage amounts are displayed. The dollars/number display section 214 can be used to display error codes for mailing errors such as overweight package or invalid mode of shipment.

The keyboard 118 includes a 10 key numerical entry section 216. The type of information entered through this numerical entry section 216 can include two-digit zone entries for domestic mailings, three-digit country codes for international mailings, known postage amounts, known special fee amounts, and the like.

A CE/C key 217 can be used to clear the display or to instruct the system to disregard previously entered information.

A + key 219 is used to add numerical values to existing data.

Some of the keys in the numerical entry section 216 are overprinted with class of service information, allowing each of such keys to perform two functions when desired. The class of service functions are accessed by first depressing the key labelled CLASS 218. The class of service functions permit the user to select from various United States Postal Service classes, United Parcel Service classes or international classes of service. A special fee key 220 is provided for permitting additional postage to be computed for special services. The special fee key 220 included on the keyboard 118 in this embodiment of the invention is used for three functions: UPS, SPEC SERV, and COD.

The SPEC SERV function indicates special services which require an additional fee, determined by weight, in addition to regular postage for expeditious delivery of mail (First Class, Priority, Third and Fourth Class). The COD function indicates cash on delivery. USPS, UPS, First, Third and Fourth Class mail currently may be sent C.O.D.

An OVERSIZE key 224 is provided to indicate that the parcel to be mailed exceeds the overall dimensions established by the U.S. Postal Service for shipment. In such cases, an additional fee must be incorporated in the total postage due, and this additional fee can be entered through the numerical entry section 216 of the keyboard 118.

A ZONE/CODE key 222 has two functions, one of which is to call a zip-to-zone conversion routine. When this routine is called, a user can enter the three digit prefix or the zip code of a domestic destination. The calculator will compute the zone value using the local zip code at the point of origin as a base value. The second function of the ZONE/CODE key 222 is to allow the user to enter the two-digit destination code directly if it is known.

The keyboard further includes a PRINT key 226 by which the user enables a postage meter to print the computed postage directly on a parcel or on a tape once the user is satisfied that the proper information has been entered into the calculator 116.

A ZERO key 228 is provided to allow the user to eliminate the effect of an object on the pan of the scale 114, if any. The present invention is intended for use on an automatically zeroing scale, but the automatic zero function can be overridden by a user by depressing the ZERO key 228.

In the present embodiment, shown in FIG. 2, two keys 230 and 232 are shown blank, having no defined function.

As previously indicated, the location of keys on the keyboard 118 which perform the functions described above, as well as service functions which users are normally prevented from performing, can be changed and keys can be redefined or eliminated by the user or by a service representative, if desired. The program with which the system is loaded must be suitably modified to accommodate any such key redefinitions. Such a program may reside on a removable integrated circuit board that also contains postage rate information. Reference numeral 122 (FIG. 1) indicates the relative functional location of the PROM that contains such a keyboard modification program. The PROM 122 can be loaded or preprogrammed by the system manufacturer, thus requiring no additional effort by the user or by the service representative.

Figure 3:
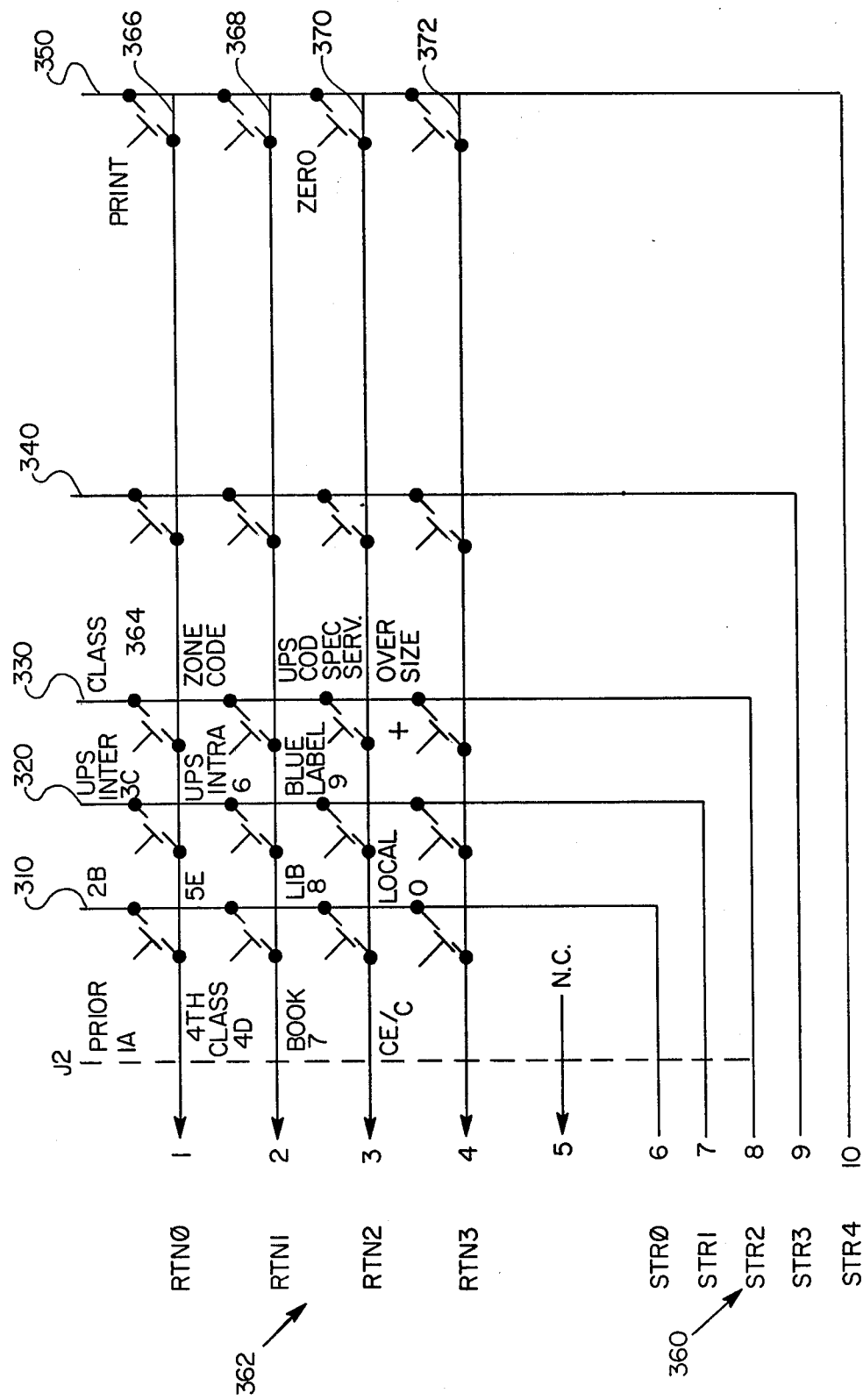
FIG. 3 is a schematic representation of the electrical connections of the keyboard data entry subsystem.
Figure 4A:
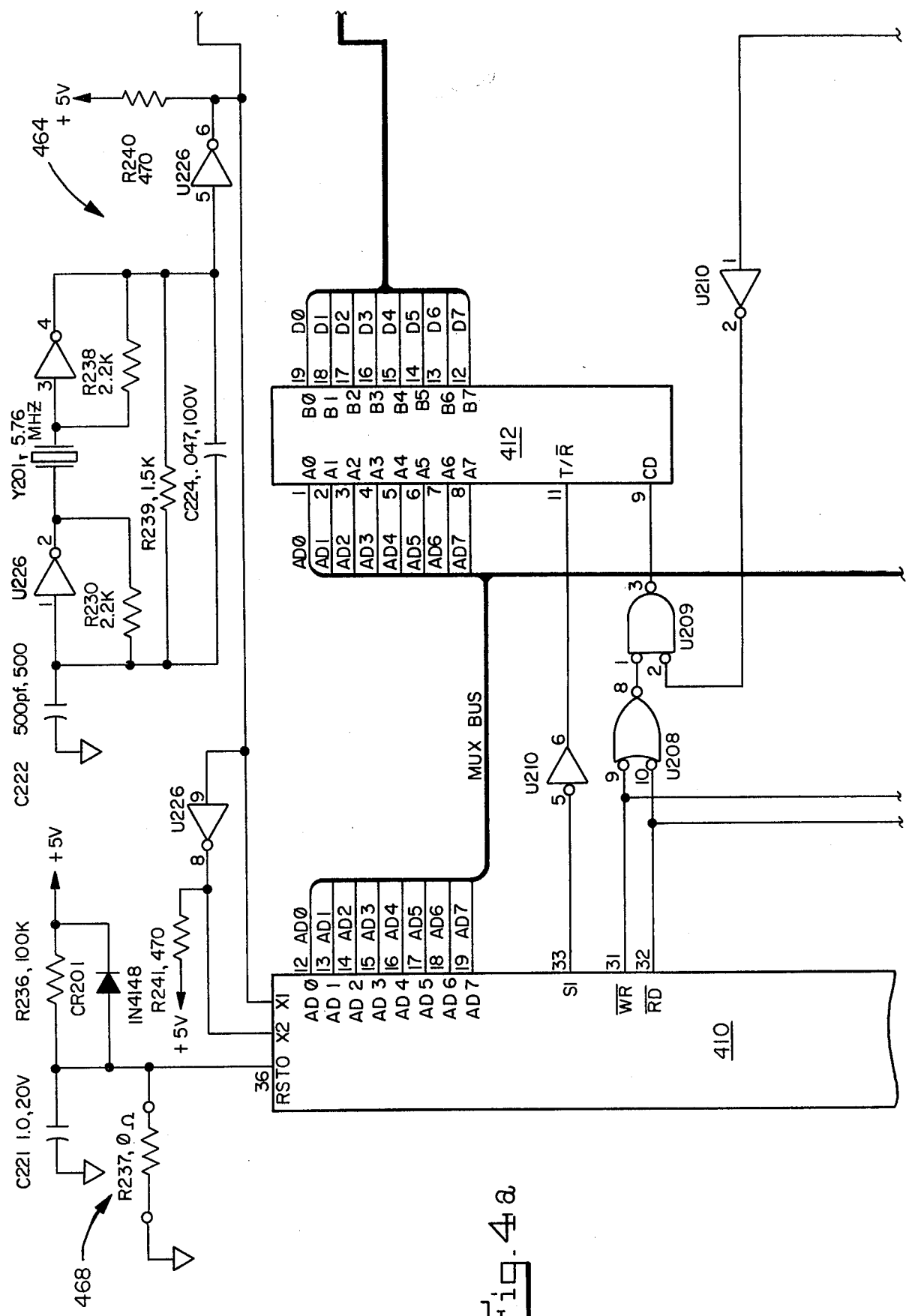
Figure 4B:
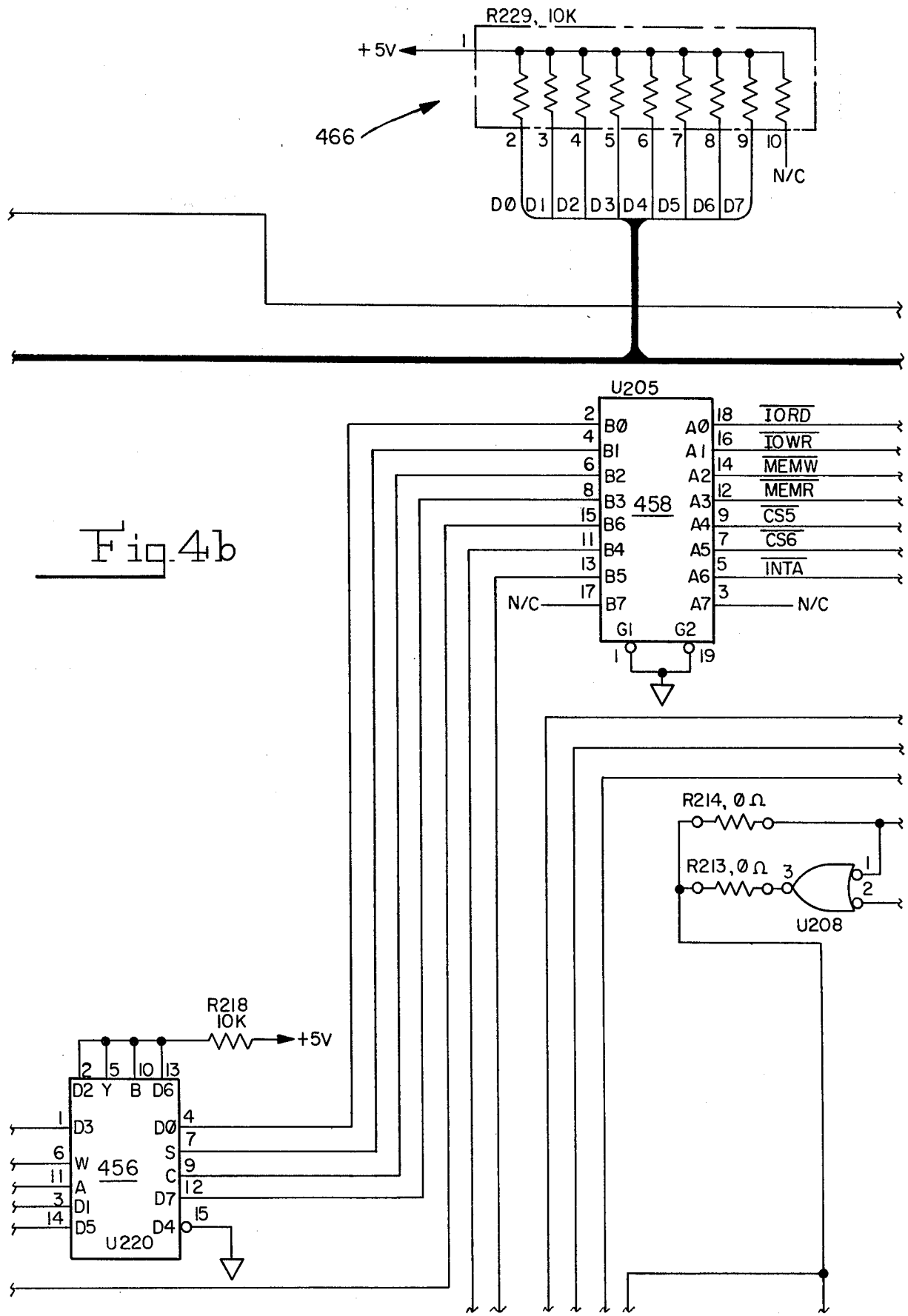
Figure 4D:
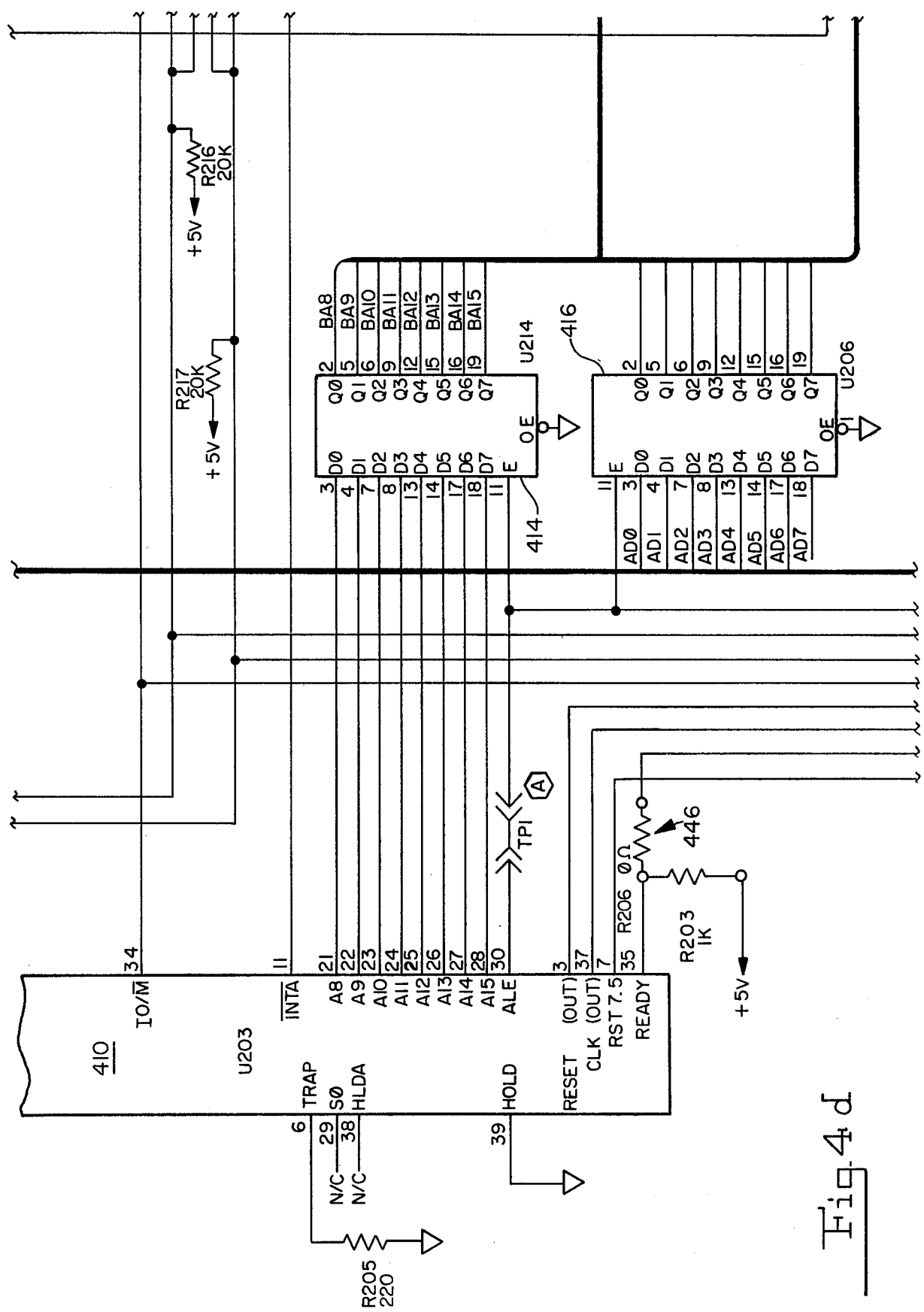
Figure 4F:
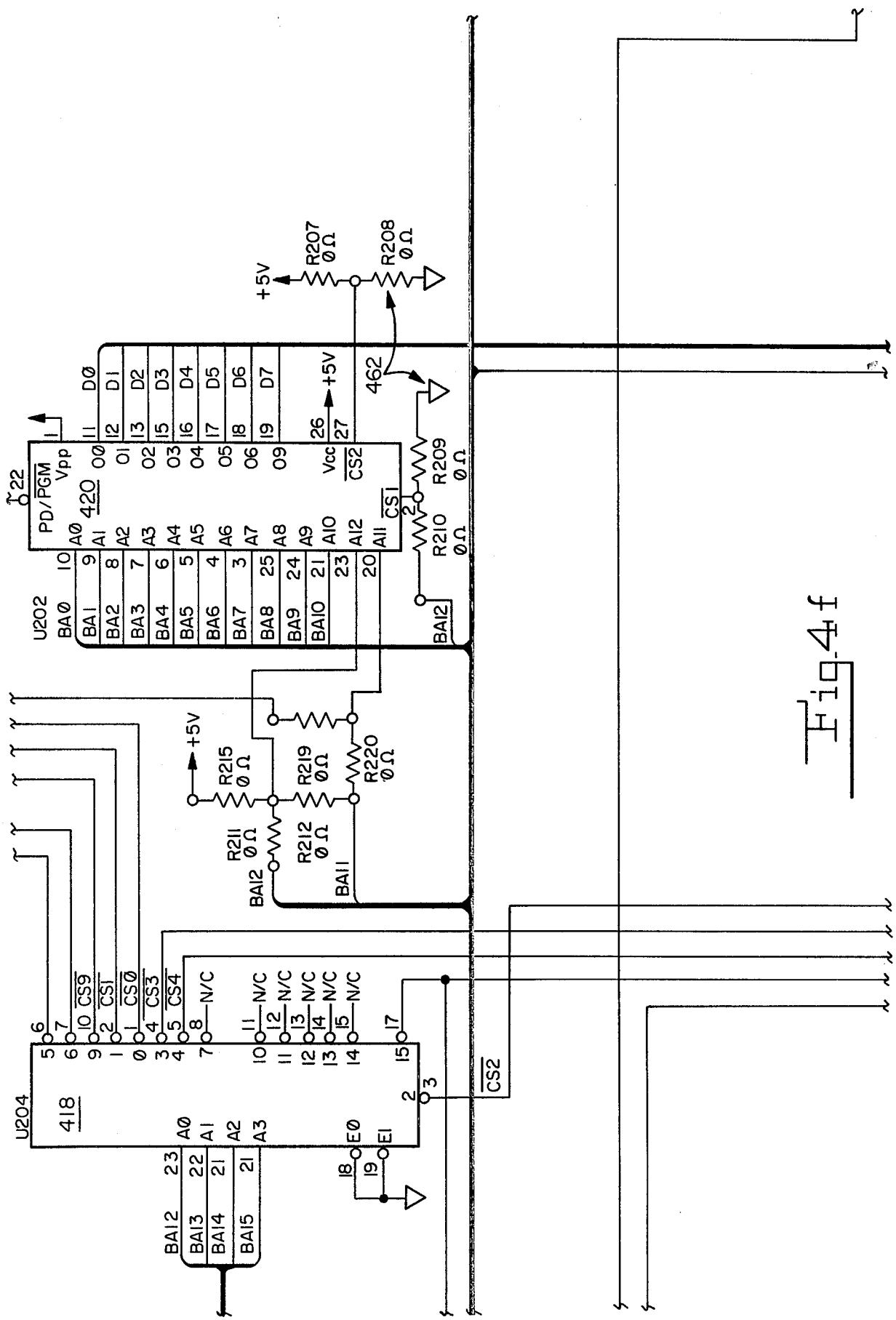
Figure 4G:
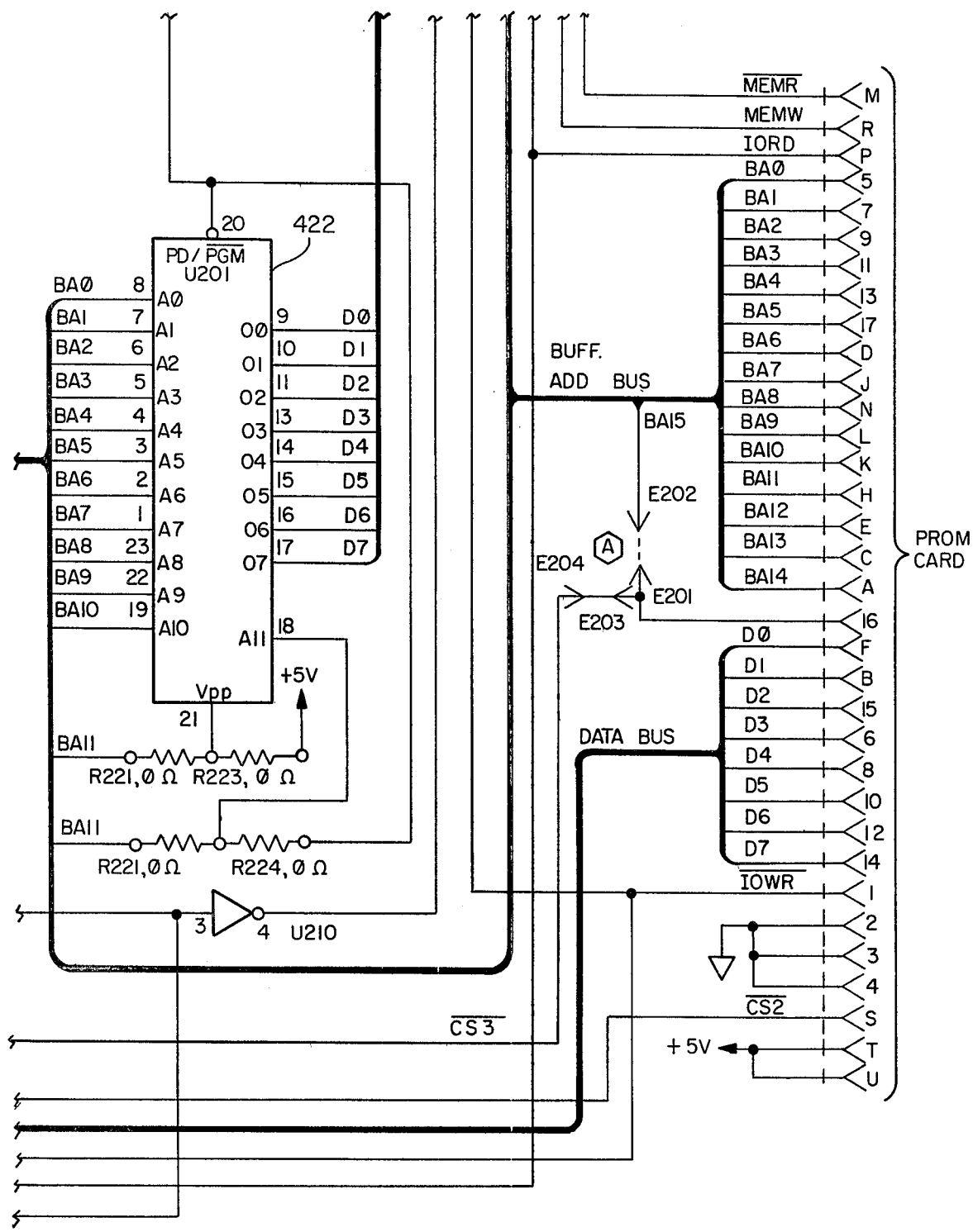
Figure 4H:
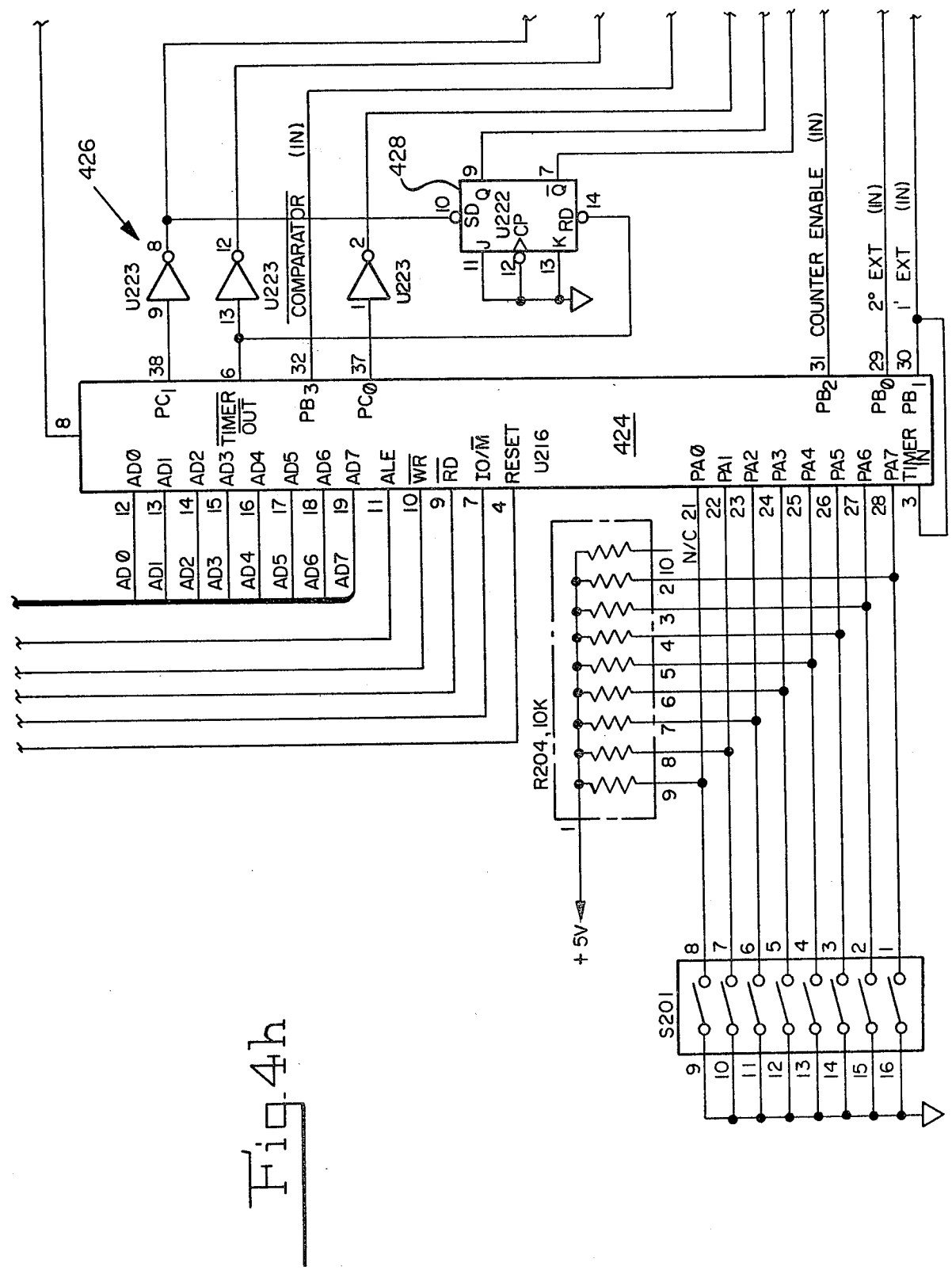
Figure 4I:
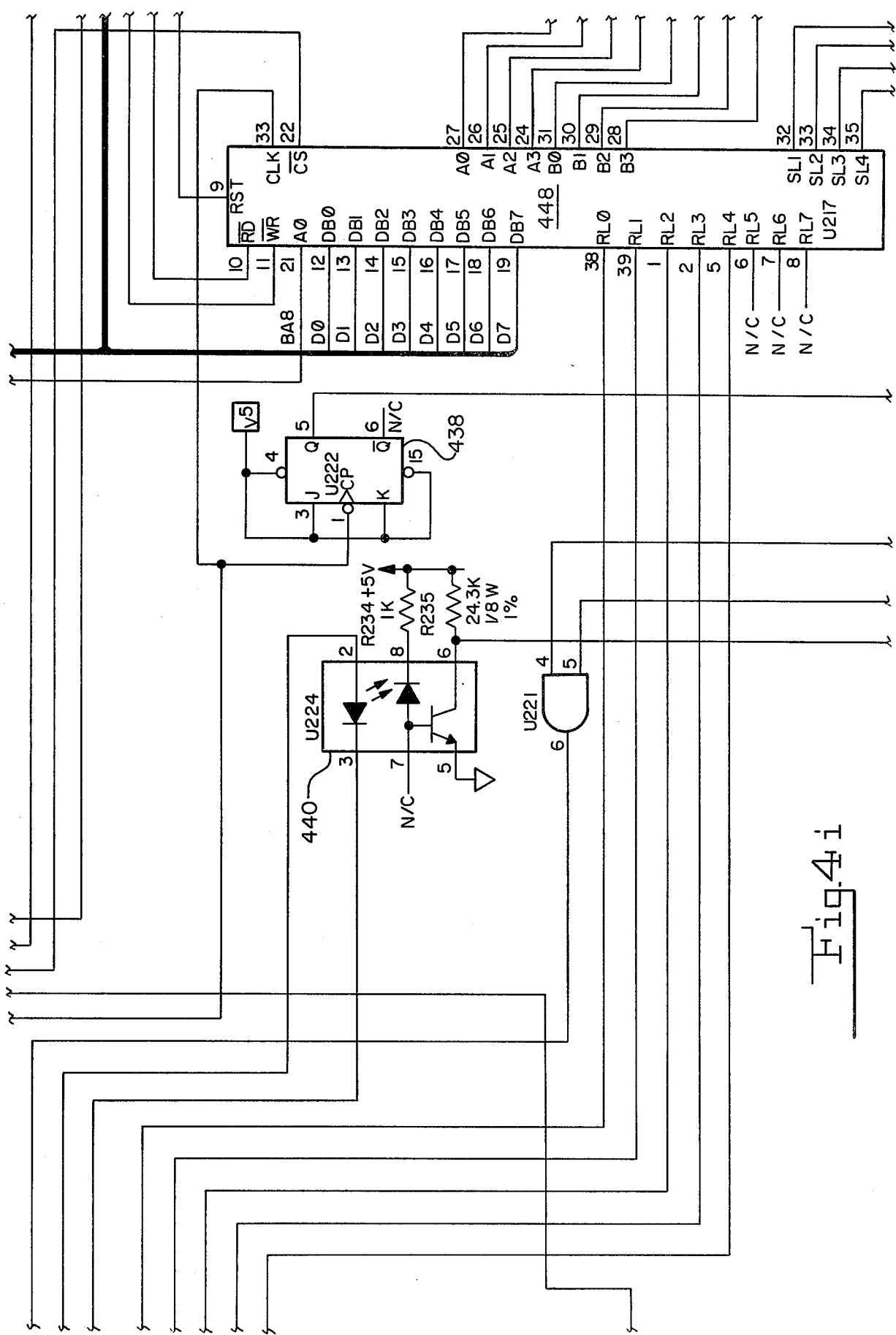
Figure 4K:
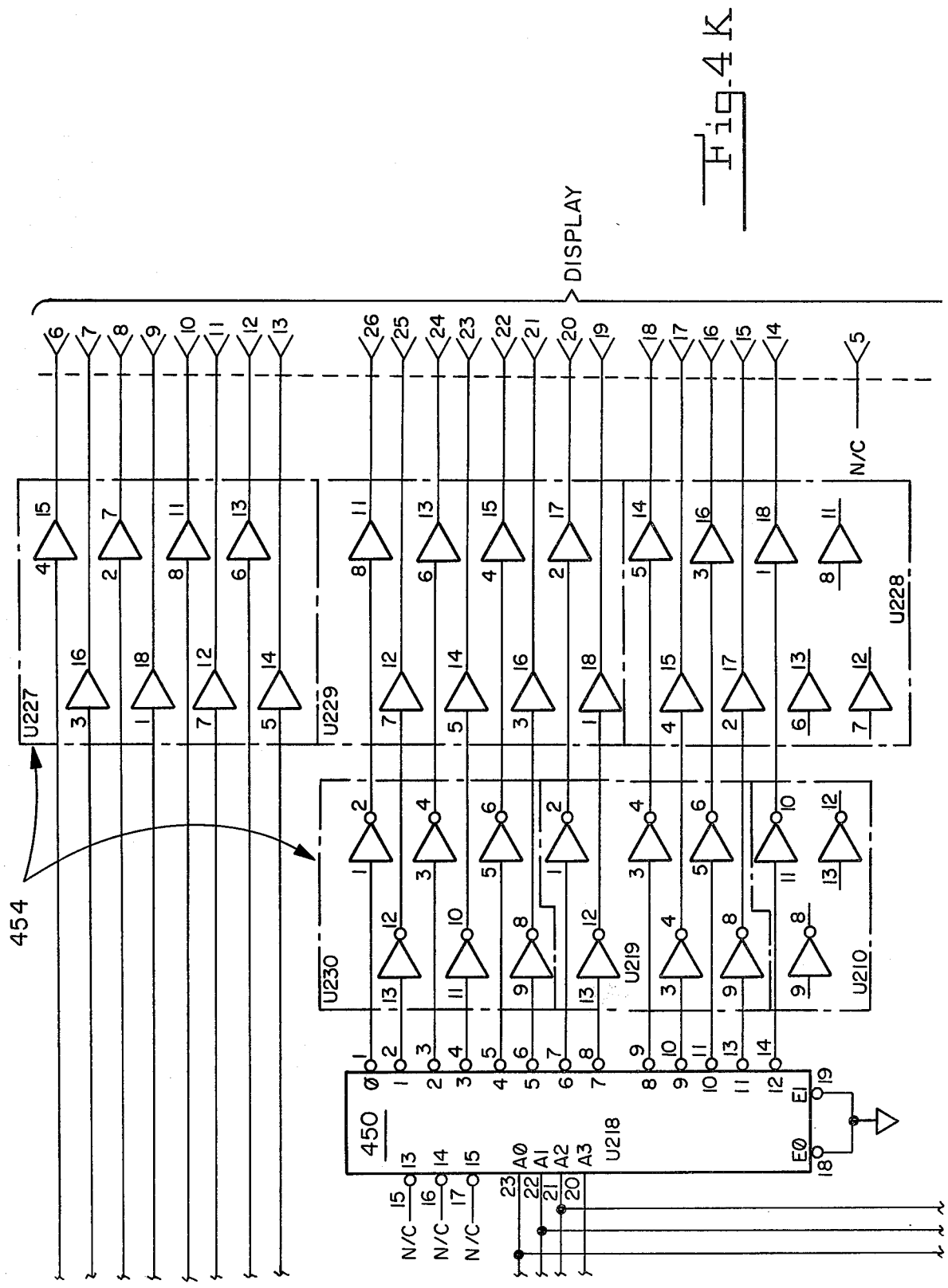
Figure 41:
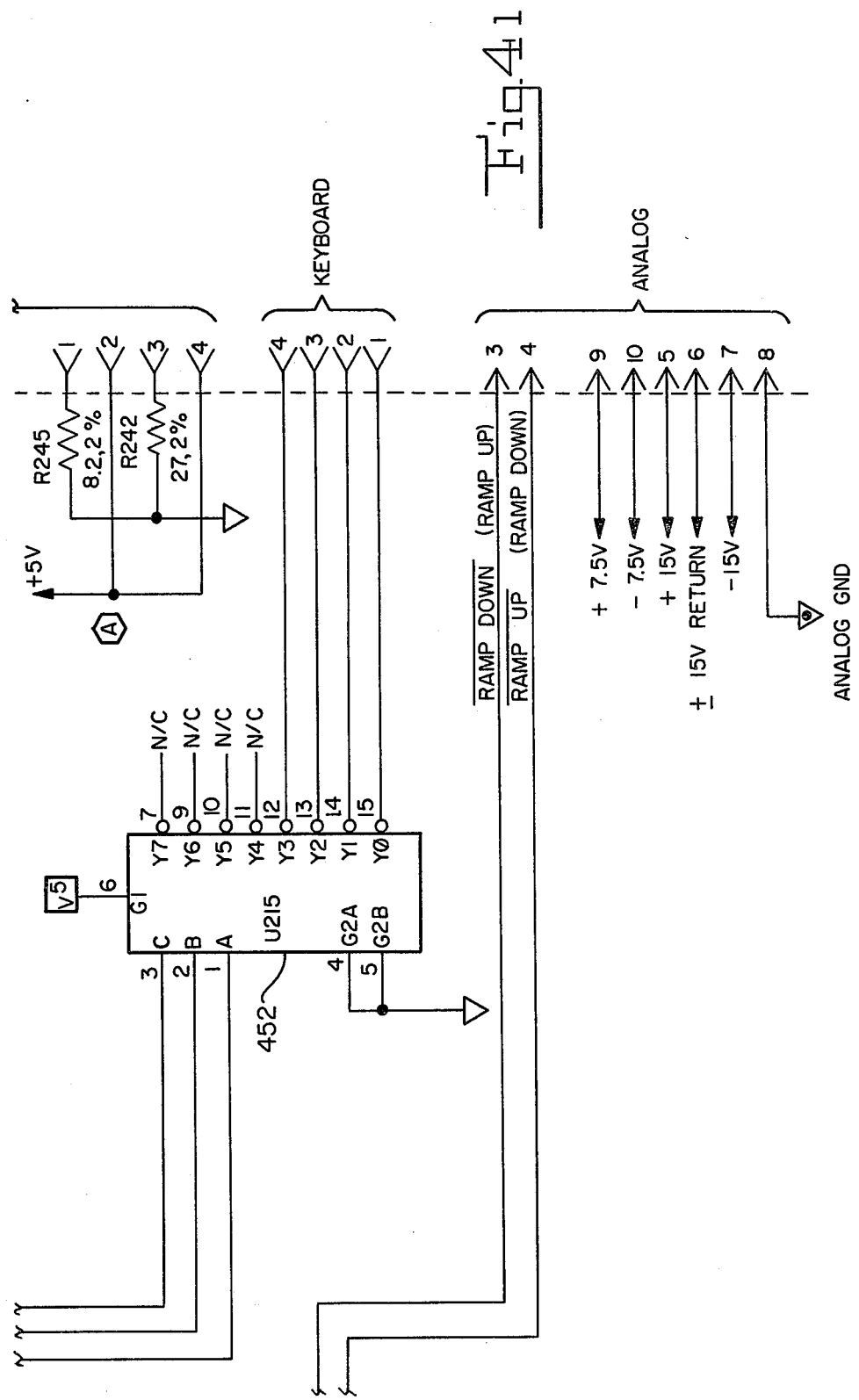

Referring now also to FIG. 3, the number of keys in the keyboard of the system may vary, depending upon the complexity of the functions which the system is expected to serve. In a preferred embodiment of the system, up to 20 different key depressions can be detected by arranging the keys of the keyboard in a row and column matrix with each of the rows having a common connection to a keyboard return to the system and each of the columns having a common connection to a strobe output from the system. Such an arrangement is illustrated in FIG. 3 wherein five complete columns 310, 320, 330, 340 and 350 of key connections are shown.

Each column 310, 320, 330, 340, 350 is connected to one of five strobe outputs STR0–STR4, respectively, shown generally at reference numeral 360. These strobe outputs 360 are sequentially raised to provide a binary one signal which ripples across the array of strobe connections. Each of the four rows 366, 368, 370, 372 in this embodiment, is connected to one of four return input lines RTN0–RTN3, respectively, shown generally at reference numeral 362.

If a switch at the junction of a particular column and a particular row is closed or depressed when the strobe line 360 is energized, a binary one signal is transmitted on the corresponding return line 362 back to the system. Conversely, if the switch is open when the column voltage is raised to a binary one level, the return line 362 detects only an open circuit. As a specific example, if a switch 364 at the junction of column 330 and row 366 is closed when strobe line STR2 is driven to a binary one level, the voltage return line 366 carries a binary one signal. If the remaining switches in column 330 are open at the time, a binary 1000 signal is read by the system by raising the voltage on the strobe lines in succession, permitting the keyboard 118 to be checked for depressed keys four at a time.

Referring now also to FIG. 4, there is shown a schematic diagram of the interface in accordance with the present invention. A single chip Model No. 8085-A eight bit N-channel microprocessor 410 is connected over a multiplexed communication bus to an eight bit tri-state bi-directional data bus driver 412. The microprocessor 410 is also connected to a tri-state buffer 414 and 416, such as Model No. 74LS373 octal transparent latches. Connected to the buffer 414 and 416 is a Model No. 74LS154 four-to-sixteen line decoder/demultiplexer 418. Also connected to the address latches 414 and 416 is a set of EPROMs 420 and 422. These EPROMs 420 and 422 are used for program storage to decode strobe and return signals, as described hereinabove with regard to FIG. 3.

Also connected to the microprocessor 410 over the multiplexed communication bus is a Model No. 8155 random access memory (RAM) and input/output (I/O) device 424. Analog to digital (A/D) circuitry is connected to the RAM and I/O device 424, shown generally at reference numeral 426. Also connected to the RAM and I/O device 424 are dual JK flip flops 428, 430, 432, 434 and 436.

An optical coupled isolater, Model No. 6N136, is shown at reference numeral 440, connected to the microprocessor 410 and the A/D circuitry 426. Two Model No. 74LS74 dual D-type flip flops are shown at reference numerals 442 and 444, connected to the microprocessor 410. A resistor 446 is connected between the READY line of the microprocessor 410 and the D-type flip flops 442 and 444. The D-type flip flops 442 and 444 are used to cause a wait state in the microprocessor 410, depending upon the status of resistor 446.

A Model No. 8279-5 programmable keyboard/display interface 448 is connected to the EPROMs 420 and 422 for the purpose of refreshing the display and updating memory allocations via key depressions on the keyboard 118.

A Model No. 74LS154 one-to-sixteen line decoder/demultiplexer 450 is connected to the keyboard display interface 448 and is used to decode display circuitry. Similarly a Model No. 74LS138 one-to-eight line decoder/demultiplexer 452 is connected to the keyboard display interface 448 for the purpose of decoding keyboard circuitry.

Optional circuitry shown at reference numeral 454 is used as display drivers, and includes Model No. 74LS04 hex inverters and fluorescent display drivers, Model No. 6118A. The display drivers 454 can be connected to the display circuitry decoder 450. The output from the display driver circuitry 454 is applied to the display 210.

A Model No. 74LS157 data selector/multiplexer or I/O decoder 456 is connected to the microprocessor 410. Connected to this I/O decoder 456 is a Model No. 74LS244 three-state octal buffer 458. The octal buffer 458 is used to decode I/O memory, and the output from this octal buffer 458 is applied to the Echoplex interface.

A PROM size decoder 460 is connected to the four-to-sixteen line decoder 418 and to the EPROMs 420 and 422 for specifying the memory size of the EPROMs 420 and 422 currently being used. The PROM size decoder 460 comprises quad two-input OR gates. Also connected to the EPROMs 420 and 422 is a PROM type decoder 462, which specifies the type of EPROMs 420 and 422 that are to be used in the present configuration.

A clock circuit is shown at reference numeral 464 and is connected both to the microprocessor 410 and to the Echoplex interface to supply a 5.76 Megahertz signal. A series of pull-up resistors 466 is connected to the data bus driver 412 and to the data bus, which is applied to the Echoplex interface. These pull-up resistors 466 are used to minimize noise on the data bus. Power-on circuitry 468 is applied to the microprocessor 410.

In operation, the user inserts a specified key function ROM, not shown, into the scale 112. The user then turns the scale 112 on by supplying power thereto, and begins depressing keys to be defined through the inserted ROM.

The depressed key generates a signal applied through the keyboard connector into the keyboard display chip 448. The keyboard display chip 448 signals the microprocessor 410 that a key has been depressed. The signalling operation occurs through the data bus when polled by the microprocessor 410. The microprocessor 410 reads data through the tri-state buffer 416.

Once the microprocessor 410 receives the signal that a key has been depressed, it reads in the strobe and return signals from the key, and points at the key directory ROM, not shown, through address latches 414 and 416. The tri-state buffer for the data bus is shown at reference numeral 412. The address is latched out and sent through a decoder 418. This decoder 418 generates a chip select signal and applies it to the key directory ROM, which allows access to the memory in that ROM.

The microprocessor 410 stores the strobe and return signal in its internal memory and performs comparisons on the strobe and return in the key directory ROM until a match is found. Once a match has been found, the microprocessor 410 points to the key function part of the directory ROM. The microprocessor 410 then reads in the function corresponding to the strobe and return signal that is generated through the key depression.

The signal from the PROM card is sent through the buffer data bus to the tri-state buffer 412.

Once the microprocessor 410 receives the function from the key function ROM, it then executes its programming code through an execute command routine. The execute command routine decodes this function and vectors into a sub-routine which executes the specified function.

For example a depression of a key with a strobe and return of 1 2 might correspond to a function of 1 1. The strobe and return 1 2 is read into the microprocessor 410. The microprocessor 410 compares the signal to a strobe and return table in the key directory ROM. When it locates 1 2, it points to the function corresponding to 1 2. It then reads in the function which is a 1 1. The function is then sent to the execute command routine which decodes the function. This particular function, a 1 1, corresponds to a key depression of a 1 (i.e., a digit entry of 1).

After a function has been decoded fully by the microprocessor 410, the microprocessor 410 updates the display 210 if required to indicate that the function has been decoded and executed. The microprocessor 410 updates the display 210 by sending data through the data bus and data bus buffer 412. A chip select signal is generated by the address bus through latches 414 and 416 through the decoder 418 which causes a chip select indication on the display chip 448. The data is then sent to the display 210 through the display driver circuitry 454.

Functions can be changed simply by replacing the key directory ROM with the same strobe and return table for a specified keyboard. Thus, different functions are assigned to the same strobe and return locations. The keyboard 118 can be changed while incorporating the same functions by associating the keys on the keyboard 118 with different strobe and return signals and replacing the key directory ROM with the strobe and return signals corresponding to that keyboard. In this case, however, the same functions correspond to the same key locations. Thus, the onboard ROM chips need not be replaced. This allows a customer and/or service representative to change the functions of the machine simply by changing the directory ROM which is accessible through the key PROM rack, not shown.

The service representative may also have access to functions that a customer would not normally have access to, such as weight entry key functions. A weight entry key, not shown, is not generally included as a function of the 1-70 scale of the present invention. It may be defined as one of the unmarked keys 230 or 232. When it is useful for a service representative to calibrate a scale, he/she can use a function designed for that purpose and need not carry weights to the customer site. The service representative's directory has provision for a weight entry key strobe and return signal, associated with which is a weight entry function to allow him access to that subroutine.

Other examples of functions for exclusive use of a service representative are a gross counts mode to determine whether scale operation is objectionably noisy, and a test key to perform numerous test functions in the service representative's key directory, such as a linearity test for the scale and a display verify routine.

The unmarked or blank keys 230 and 232 on the keyboard 118 can also represent such functions as are performed by a RECORD ONLY key which prints only to peripherals and a printer, but is not used to trip postage meters connected thereto.

Special fees, such as C.O.D., return receipt, registered and other commonly used special fees can also be incorporated into the scale by using one of the spare keys 230 and 232 and by ensuring that appropriate subroutines are already resident in the program code. If in the future a need for special fees arises, they can be accessed simply by changing the directory ROM.

While there has been described what is considered to be a preferred embodiment of the invention, variations and modifications therein will occur to those skilled in the art when they become acquainted with the basic concepts of the invention. Therefore, it is intended that the appended claims shall be construed to include the preferred embodiment and all such variations and modifications as fall within the true spirit and scope of the invention.

What is claimed is:

1. An electronic weighing scale system or the like capable of performing a plurality of different functions comprising:
    a keyboard for providing access to at least a subset of the functions said system can perform, said keyboard containing a plurality of keyswitches each arranged to provide a separate identifying output code when actuated;
    interchangeable means responsive to said output codes for establishing the particular system function to be controlled by each different keyswitch, said interchangeable means having an input coupled to receive said keyswitch output codes and an output on which said means can present a plurality of function identification codes, each one representative of an established keyswitch function; and
    system processor means coupled to said output for executing said system functions as directed by said function identification codes in response to keyswitch actuations.

2. The system of claim 1 wherein said interchangeable means comprises a non-volatile memory element having:
    (i) a first array with a plurality of memory locations containing said function identification codes; and
    (ii) means for one-to-one correlating said keyswitch output codes with particular function identification codes.

3. The system of claim 2 wherein said means for correlating comprises:
    a second array with a second plurality of memory locations, each corresponding to one of those in said first array, at least some of said locations in said second array containing data which is identical to output codes capable of being provided by said keyboard; and said system processor means comprises means for comparing a keyswitch output code generated by said keyboard to successive output codes stored in said second array until a match is found, and for retrieving the function identification code from the memory location in said first array which corresponds to the memory location in said second array in which said match was found.

4. The system of claim 2 or 3 wherein said correspondence between particular keyswitches on said keyboard and particular system functions is established by said interchangeable means and can be varied by replacing one non-volatile memory element with another.

5. The system of claim 2 or 3 wherein said keyboard comprises n keys and said system processor comprises a microprocessor system with software for executing greater than n system functions and said interchangeable means serves to provide keyboard access to a predetermined subset of said greater than n system functions.

6. The system of claim 3 wherein said system is a postal weighing scale system further comprising a read only memory containing postal rate data and wherein said system computes the postage for a parcel weighed on said system in accordance with the weight of said parcel and said postal rate information and further in accordance with particular system functions selected by actuation of particular keyswitches as correlated with said system functions by said interchangeable means.

7. The system of claim 6 wherein said read only memory and said interchangeable means comprise a single integrated circuit.

8. The system of claim 2 wherein said system is a postal weighing scale system further comprising a read only memory containing postal rate data and wherein said system computes the postage for a parcel weighed on said system in accordance with the weight of said parcel and said postal rate information and further in accordance with particular system functions selected by actuation of particular keyswitches as correlated with said system functions by said interchangeable means.

9. The system of claim 1 wherein particular subsets of said system functions are mapped to said keyswitches by particular ones of said interchangeable means, whereby a user may define the subset of said system functions accessable through said keyswitches by selecting a particular one of said interchangeable means.

10. An electronic mailing system or the like capable of performing a plurality of different functions comprising:
  a keyboard for providing user access to at least a subset of the functions said system can perform, said keyboard containing n keyswitches each arranged to provide a separate identifying output code when actuated;
  interchangeable means comprising a non-volatile memory element having:
    (i) a first array with a plurality of memory locations containing address words, each of said address words identifying a particular one of said system functions and
    (ii) means for correlating said output codes with particular address words, said interchangeable means being responsive to said keyswitch output codes for establishing the particular system function to be controlled by each different keyswitch,
  said interchangeable means having an input coupled to receive said keyswitch output codes and an output on which said interchangeable means can present particular ones of said address words corresponding to said received keyswitch output codes; and
  system processor means comprising a microprocessor system with software for executing said system functions, said system processor means being coupled to said output of said interchangeable means for executing system functions as directed by said address words in response to keyswitch actuations.

11. An electronic mailing system or the like capable of performing a plurality of different functions comprising:
  a keyboard for providing user access to at least a subset of the functions said system can perform, said keyboard containing n keyswitches each arranged to provide a separate identifying output code when actuated;
  interchangeable means comprises a non-volatile memory element having:
    (i) a first array with a plurality of memory locations containing function identification codes; and
    (ii) means for correlating said keyswitch output codes with particular address words, said means for correlating comprising a second array with a second plurality of memory locations, each corresponding to one of those in said first array, at least some of said locations in said second array containing data which is identical to particular keyswitch output codes capable of being provided by said keyboard,
  said interchangeable means being responsive to said keyswitch output codes for establishing the particular system function to be controlled by each different keyswitch, said interchangeable means having an input coupled to receive said keyswitch output codes and an output on which said interchangeable means can present particular ones of said address words corresponding to said received keyswitch output codes;
  system processor means comprising a microprocessor system with software for executing said system functions, said system processor means being coupled to said output of said interchangeable means for executing said system functions as directed by said address words in response to keyswitch actuations; and
  said system processor means further comprising means for comparing a keyswitch output code generated by said keyboard to successive output codes stored in said second array until a match is found, and for retrieving the function identification code from the memory location in said first array which corresponds to the memory location in said second array in which said match was found.

12. An electronic data processing system capable of performing a plurality of different functions comprising:
  input means for providing access to a subset of the functions said system can perform, said input means having a plurality of selection means each arranged to provide a separate identifying output code when actuated;
  interchangeable means responsive to said output codes for establishing the particular system function to be controlled by each different selection means, said interchangeable means having an input coupled to receive said output codes and an output for generating a plurality of function identification codes, each one representative of an established selection means function; and means coupled to said output for performing functions in response to said function identification codes and in response to actuation of said selection means.

13. The system of claim 12 where in the correspondence of said selection means to said system functions is established by said interchangeable means and can be varied by replacing one interchangeable means with another.

14. The system of claim 12 wherein said input means has n selection means and said performing means coupled to said output of said interchangeable means is capable of performing greater than n functions whereby said interchangeable means provides access to a predetermined subset of said greater than n functions.

15. The system of claim 13 or 14 wherein said interchangeable means comprises:
 (i) a first array with a pluralty of locations containing said function identification codes; and
 (ii) means for associating said output codes with corresponding function identification codes.

16. The system of claim 13 wherein particular subset of said system functions are mapped to said selection means by particular ones of said interchangeable means, whereby a user may define the subset of said system function accessable through said selection means by selecting a particular one of said interchangeable means.

17. An electronic data processing system capable of performing a plurality of different functions comprising:
 input means for providing user access to a subset of the functions said system can perform, said input means having n selection means, each arranged to provide a separate identifying output code when actuated;

interchangeable means comprising:
 (i) a first array with a plurality of locations each containing an address word; and
 (ii) means for associating each of said output codes with a corresponding address word, said means for associating comprising a second array with a plurality of locations, each corresponding to one of those in said first array, some of said locations in said second array containing data identical to the output means, said interchangeable means being responsive to said output codes for establishing the particular system function to be controlled by each different selection means, said interchangeable means having an input coupled to receive said output codes and an output for generating a plurality of address words, each one representative of an established selection means function;

means for performing said systems functions, said performing means being coupled to said output for performing said system functions in response to said address words and in response to selection means actuations; and said performing means further comprising means for comparing an output code generated by said selection means to successive output codes stored in said second array until a match is found, and for retrieving the address word from the location in said first array which corresponds to the location in said second array in which said match was found.

18. The system of claim 17 wherein said system is a postal weighing scale system further comprising a read only memory containing postal rate data wherein said system computes the postage for a parcel weighed on said system in accordance with the weight of said parcel and said postal rate information and further in accordance with particular systems functions selected by actuation of particular selection means as correlated with said system functions by said interchangeable means.

* * * * *